United States Patent

Miller et al.

[11] Patent Number: 5,534,348
[45] Date of Patent: Jul. 9, 1996

[54] HOLLOW BOROSILICATE MICROSPHERES AND METHOD OF MAKING

[75] Inventors: J. Stanley Miller, Collegeville; Reginald Thompson, Chester, both of Pa.

[73] Assignee: PQ Corporation, Valley Forge, Pa.

[21] Appl. No.: 411,394

[22] Filed: Mar. 28, 1995

Related U.S. Application Data

[63] Continuation of Ser. No. 118,421, Sep. 8, 1993, abandoned.
[51] Int. Cl.$^6$ ............................................. B32B 9/00
[52] U.S. Cl. .................... 428/402; 428/404; 428/406; 501/39; 65/21.4; 65/22
[58] Field of Search ........................ 428/402, 406, 428/404; 501/39; 65/21.4

[56] References Cited

U.S. PATENT DOCUMENTS

| | | | |
|---|---|---|---|
| 2,797,201 | 6/1957 | Veatch et al. | 260/7.5 |
| 2,978,339 | 4/1961 | Veatch et al. | 106/40 |
| 2,978,340 | 4/1961 | Veatch et al. | 106/40 |
| 3,030,215 | 4/1962 | Veatch et al. | 106/40 |
| 3,365,315 | 1/1968 | Beck et al. | 106/40 |
| 3,699,050 | 10/1972 | Henderson | 252/317 |
| 4,119,422 | 10/1978 | Rostoker | 65/22 |
| 4,778,502 | 10/1988 | Garnier et al. | 65/21.4 |
| 5,069,702 | 12/1991 | Block et al. | 65/21.4 |

*Primary Examiner*—Patrick J. Ryan
*Assistant Examiner*—Kam F. Lee
*Attorney, Agent, or Firm*—Ratner & Prestia

[57] ABSTRACT

The present invention provides hollow borosilicate microspheres having a mean particle size between 15 and 20 microns, and a true density below 0.25 g/cc. The invention also provides a method for making such microspheres comprising spray drying a solution of sodium silicate and sodium borate in a spray tower to form a precursor, milling the precursor, and heating the crushed precursor to a temperature in excess of 600° F. to form hollow borosilicate microspheres.

8 Claims, No Drawings

HOLLOW BOROSILICATE MICROSPHERES AND METHOD OF MAKING

This application is a continuation of application Ser. No. 08/118,421, filed Sep. 8, 1993, now abandoned.

BACKGROUND OF THE INVENTION

1. Field of the Invention

The present invention relates to small hollow borosilicate microspheres and processes for the production thereof.

2. Description of the Related Art

Generally, microspheres are very small spheres of material which are useful as fillers in the plastics industry. Microspheres may be made from siliceous material, ceramic, glass, plastic, or mineral. Specifically, microspheres may be made from borosilicate material. These microspheres may be solid or hollow.

The present application is concerned primarily with hollow siliceous microspheres, particularly those made from borosilicate material. Hollow borosilicate microspheres have wide application. They can be used in reflective paints and coatings. They can also be incorporated into molded plastic products, resulting in several advantages including cost reduction, controlled density of molded parts, improved workability of a finished product including nail and screw holding and sanding and finishing, and thermal insulation. The hollow borosilicate microspheres can also be used in such products as cultured marble for aesthetic purposes and to prevent cracking. These advantages of hollow microspheres are utilized in a number of plastic products, including simulated wood, auto body fillers, cultured marble, bowling ball cores, carpet backing, coatings, flotation devices, foams and elastomers, and spackling patching material.

Hollow glass microspheres are generally available with an average microsphere diameter of from 65 to 100 microns as measured by volumetric particle counters, although average microsphere diameters as low as 50 microns have been obtained. These hollow microspheres have a density around 0.2 g/cc to 0.3 g/cc, with larger hollow microspheres generally having a lower density than smaller hollow microspheres. For many uses, hollow microspheres of this size and density are quite well suited.

In the past, many different methods of producing hollow microspheres have been developed, as evidenced in publications in this area. For instance, U.S. Pat. No. 2,797,201 to Veatch, et al., discloses a process for forming hollow particles from film-forming plastic material including cellulose derivatives, thermoplastic synthetic resins, acrylic resins, and thermosetting resins. The film-forming material is dissolved in a suitable volatile solvent along with a latent gas material. The film-forming material is divided into fine droplets and dried at a temperature which induces the evolution of gas from the latent gas material. The expanding gas inflates the drying droplet to form hollow particles. This process produces small, lightweight particles; however the process is not used with a borosilicate material, and no method for making very small, lightweight borosilicate microspheres is shown.

U.S. Pat. No. 2,978,339 to Veatch, et al., discloses a process for forming hollow particles from finely divided, solid particles of material forming a glass upon fusion. The glass particles are mixed with a compound which liberates a gas at the temperature of fusion of the glass. The solid particles are introduced into the top of a furnace zone which has a stream of hot gas running up through it. The hot gas causes the particles to fuse and liberate gas, whereby the hollow particles are formed. The flow rate of the hot gas is adjusted so that the larger particles remain in the hot zone for a longer period of time than the smaller particles. While this reference shows the production of traditional-sized hollow glass particles, no reference to very small microspheres of 15 to 20 micron diameter is shown.

U.S. Pat. No. 3,365,315 to Beck, et al. purports to show a method for making hollow glass bubbles which vary from 5 to 300 microns in diameter and a method for making hollow glass bubbles which have an average true particle density between 0.05 to 1.2 g/cc. However, only bubbles having mean diameters between 41 microns and 42 microns and true densities between 0.42 g/cc and 0.57 g/cc were formed in the examples presented (mean diameters were calculated by averaging the range of diameters within which 90% of the bubbles fell). No bubbles having a small diameter and a low density are shown. The process includes heating glass beads fused in an oxidizing atmosphere to a temperature where the viscosity is between 10 and 10,000 poises for no more than 2 to 3 seconds. This is accomplished by dropping the particles through a heating zone. Again, small lightweight hollow particles are not shown, nor is a working method of making them.

U.S. Pat. No. 3,699,050 to Henderson discloses spray dried particulate feed material for the commercial production of hollow, spherical, unitary, discrete glass spheres. The precursor comprises hollow alkali metal borosilicate particles, substantially all of which have discontinuous skins, and a predominant number of which are attached to at least one other particle. The feed is then introduced to a spheridizing furnace to form the hollow spherical product. While this publication appears to show the production of relatively low density hollow material (about 0.37 g/cc true density), it does not show a small diameter particle having such a low density.

U.S. Pat. No. 4,119,422 to Rostoker discloses a gel method for producing cellular borosilicate bodies from an aqueous slurry of colloidal silica, caustic potash, boric acid and alumina. The slurry is dried, crushed, and calcined and quickly cooled, although the crushing (or milling) may be done after the calcination and cooling. Once crushed, the material is introduced into a cellulating furnace to form microspheres. This reference appears to specify neither the size nor the density of the product microspheres.

U.S. Pat. No. 5,069,702 to Block et al., discloses a method for making small hollow glass spheres. The method requires that a surfactant be added to the liquid glass precursor mixture or solution. The surfactant-containing solution is then formed into droplets and the droplets are heated to drive off water and generate gas to form hollow glass spheres, which are then cooled. Alternatively, the surfactant-containing solution can be spray dried, then heated to form glass spheres. Block reports obtaining microsphere diameters as low as 18 microns using this method. Block does not appear to report the density of those microspheres. We have used a very similar process to get microspheres of the same size. Those microspheres had a density of about 0.55 g/cc. So high a density is undesirable in some specific applications. Accordingly, Block does not appear to disclose a method of making small, low density, surfactant-free microspheres.

U.S. Pat. No. 4,778,502 to Garnier, et al., discloses a process for making hollow borosilicate glass microspheres. The microsphere diameters reported in Garnier range from 8 to 80 microns, with densities from 0.4 g/cc (for microspheres 8 to 35 microns in diameter (with 0.59 g/cc reported for microspheres having a mean diameter of 13 microns)) to 0.24 g/cc (for microspheres 30 to 80 microns in diameter). However, production of microspheres with small mean diameters and low densities (below 0.25 g/cc) is not disclosed.

One use for hollow microspheres is in making lightweight auto body putties and spackle. The microspheres add volume, while making the putty less dense and easier to shape when cured. The resultant product with hollow microspheres is lighter in weight. However, for auto body putties, spackle, and similar products, large microspheres of 65 to 75 microns mean diameter produce a relatively rough surface when compared to traditional putties containing talc or calcium carbonate. Talc and calcium carbonate are solid mineral materials and are therefore quite dense and hard, making these materials less desirable fillers than hollow borosilicate glass microspheres. It would be desirable to develop a filler material for putty which has a low density and fine grain. Such a filler would be used to produce a lightweight putty with a smooth finish. Small, low density, hollow borosilicate microspheres would be useful as such a filler.

SUMMARY OF THE INVENTION

The present invention provides hollow borosilicate microspheres having a mean diameter below 25 microns and preferably between 15 and 20 microns, and a true density below 0.25 g/cc. The invention also provides a method for making such microspheres comprising spray drying a solution of sodium silicate and a borate-containing species in a spray tower to form a precursor, milling the precursor, and heating the crushed precursor to a temperature in excess of 600° F. to form hollow borosilicate microspheres.

DESCRIPTION OF THE PREFERRED EMBODIMENT

The present invention pertains to a method for producing very small, hollow borosilicate microspheres. As a starting material, a solution is first made from sodium silicate and sodium borate in water. This solution should be between 25 and 40 weight percent solids, and a solution of 30 to 35 weight percent solids in water is preferred. Starting solutions having inadequate solids (too low a concentration) will not form spheres properly in succeeding operations, while solutions having too high a concentration will be difficult to spray to form spheres, and may cause the formation of spheres which are too large.

The composition of the sodium borosilicate introduced into the starting solution also affects the performance characteristics of the finished microspheres. Pure sodium silicate is soluble in hot water. A material including a boron-containing anion must be added to reduce the solubility of the final composition. Furthermore, since the microspheres are to be incorporated into plastic resins, it is most desirable that they be oleophilic so that the polymeric resin will wet the microspheres. In this way, the attraction between the microspheres and polymer will be strong. Otherwise the microspheres will act as voids, weakening the resin. With this in mind, it is preferred that the weight ratio of $Na_2O:SiO_2:B_2O_3$ be between 1.0:2.5:0.2 and 1.0:3.22:0.5 for the starting material. Since no material is lost, the final product also has this ratio of $Na_2O:SiO_2:B_2O_3$. Of course this weight ratio may be varied, even outside the preferred range, depending on the desired characteristics of the final product.

The sodium borate/sodium silicate solution is then introduced into a spray tower with conditions adjusted to produce microspheres with a density of about 0.6 g/cc and about 12% moisture. Such conditions include an inlet temperature of 400°–500° F. and an outlet temperature of approximately 300° F. The spray tower divides the solution into droplets, either through a nozzle or by dropping the solution onto a spinning disk. The solution falls through the tower, drying and solidifying along the way. When the material reaches the bottom of the tower, the material has formed into a borosilicate microsphere precursor for the hollow microspheres of our invention. This borosilicate precursor has a density of about 0.6 g/cc. .Since the borosilicate material is made by precipitation from solution, a borosilicate gel is formed having a moisture content of about 10 to 15%. This borosilicate gel is still somewhat water soluble. Only upon fusion (and associated dehydration) of this material will a true glass be formed.

The precursor has a mean diameter of between approximately 30 and 40 microns. The density of this precursor is too high to make the precursor a desirable filler in most materials. Since one major use for hollow borosilicate microspheres is as a lightweight filler, a lower density is highly desirable. However, this must be accomplished without increasing the size of the resultant microspheres, which is the object of our invention.

The next step in making the microspheres of the present invention is to crush the precursor. This may be performed by introducing the precursor into a jet mill, fluid energy mill, media mill, hammer mill or any other appropriate mill. The crushing of the precursor produces very small shards of borosilicate glass. These shards are solid irregularly shaped pieces of borosilicate glass. The crusher (jet mill, etc.) is adjusted to produce a shard which will provide hollow microspheres 15 to 20 microns in size and a density of around 0.20 to 0.24 g/cc upon heat treatment between 600° and 700° F.

The crushed precursor shards are then introduced into a flash popper. The flash popper comprises a heated tube, which increases the temperature of the crushed precursor to between 600° and 700° F. as the precursor moves through the tube. At this temperature each of the crushed precursor shards forms into a hollow microsphere in the flash popper. The reformation of the shards into microspheres indicates that the shards may reach a temperature sufficient to cause fusion of the borosilicate gel into glass. However, the final moisture content of the microspheres (before further drying, the moisture content is about 8 wt %) indicates the borosilicate material remains a gel.

Within the temperature range of 600° to 700° F., the microspheres formed by the flash popper have a mean diameter between 15 and 20 microns and a density around 0.22 g/cc. However, the processing parameters for making the microspheres of the present invention can be varied to produce hollow borosilicate microspheres as desired. A higher temperature in the flash popper will lead to a lower density product with a greater particle size. The density may be as low as 0.15 g/cc, but such microspheres tend to be very fragile, breaking easily when handled. Furthermore, such microspheres are larger than the desirable 15 to 20 microns, and are in the size range (though not the density range) of conventional microspheres.

Conversely, a lower temperature leads to a smaller particle size having a higher density. Hollow microspheres having a mean diameter below 15 microns can be produced in this way. Such particles will have densities on the order of 0.8 or 0.9 g/cc. As previously stated, such a high density is generally considered undesirable for most applications. However, with this higher density comes greater strength, which may be desirable for some specialized applications.

Furthermore, adjustments may be made in the initial sodium silicate/sodium borate solution. A lower sodium content will make the crushed precursor more difficult to re-form into a finished hollow microsphere. The low-sodium microspheres would tend to be smaller and with higher densities than those made at the same temperature using a material with a higher sodium content. Conversely, additional sodium may allow popping at a lower temperature to achieve a particle with similar properties to a particle produced from the preferred composition set forth above, re-formed at a normal temperature. Alternatively, the high-sodium particle can be re-formed at the same temperature to produce a larger, less dense particle.

Once the microspheres of this invention emerge from the popper, it is preferable to add a silane, such as methyltrimethoxysilane as an anti-caking agent. Generally, the microspheres emerge from the popper with about 8% moisture. This should be dried down again to 4 to 6% moisture to reduce clumping and make handling easier. The anti-caking agent should especially be used if hydrophobicity is desirable.

Using the preferred ranges set forth above, hollow borosilicate microspheres were produced having a mean particle size of 20 microns. The particle size was determined using a Microtrac® particle size analyzer. Microtrac is a trademark of the Leeds & Northrup Company of Ambler, Pa. The particle sizes of the individual microspheres ranged from 5 to 45 microns. Of course, in any microsphere production method, a range of particle sizes will be produced. Therefore, even in prior production methods, a few small spheres having a diameter below 50 microns were most likely produced. However, the present invention pertains to a method for making microspheres where the mean particle diameter is well below 50 microns, and substantially all of the particles produced have a diameter falling between 5 microns and 45 microns with a mean diameter below 25 microns.

The Gardner cup effective density of the 20 micron particles produced above was 0.20 g/cc, and the true density was 0.22 g/cc. The effective density is the density of the material when measured in a wetting fluid. Effective density divided by true density multiplied by 100 is the porosity of the microspheres (in this case the porosity equals 91).

These microspheres were then incorporated into an auto body putty formulation, and compared to a formulation using conventional hollow borosilicate microspheres having a mean diameter greater than 50 microns. The formulations were mixed in the proportions shown in Table 1.

TABLE 1

| Component | Weight lb | Weight percent | Volume percent | Volume gallons |
| --- | --- | --- | --- | --- |
| Polyester | 192.0 | 51.3 | 54.8 | 20.2 |
| Thixotrope | 3.8 | 1.0 | 0.6 | 0.2 |
| Talc | 160.4 | 42.9 | 18.0 | 6.6 |
| Conventional microspheres | 18.0 | 4.8 | 26.7 | 9.8 |
| Total | 374.2 | 100.0 | 100.0 | 36.9 |
| Polyester | 192.0 | 51.9 | 58.7 | 20.2 |
| Thixotrope | 3.8 | 1.0 | 0.6 | 0.2 |

TABLE 1-continued

| Component | Weight lb | Weight percent | Volume percent | Volume gallons |
| --- | --- | --- | --- | --- |
| Talc | 160.4 | 43.4 | 19.3 | 6.6 |
| New very small microspheres | 13.5 | 3.7 | 21.4 | 7.4 |
| Total | 369.7 | 100.0 | 100.0 | 34.4 |

The putties were formulated in batches of about 40 gallons each, at a viscosity of about 150,000 cps. The mix using the very small microspheres of the present invention was easier to spread and resulted in a smoother, finer finish when cured. Auto body putty made with these microspheres will also sand much faster than conventional putties, and will have a reduced tendency to clog sandpaper. Thus these very small hollow borosilicate microspheres are preferred to conventional microspheres and other fillers presently incorporated in autobody putties.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. Hollow borosilicate microspheres having a mean diameter below 25 microns and a true density below 0.25 g/cc.

2. The microspheres of claim 1 having a mean diameter between 15 and 20 microns.

3. The microspheres of claim 1 having a diameter between 5 and 45 microns.

4. The microspheres of claim 1 having a moisture content between 4 and 6 wt % and having a silane coating.

5. The microspheres of claim 1 comprising $Na_2O$, $SiO_2$, and $B_2O_3$ wherein the ratio of $Na_2O:SiO_2:B_2O_3$ is between 1:2.5:0.2 and 1:3.22:0.5.

6. The microspheres of claim 2 comprising $Na_2O$, $SiO_2$, and $B_2O_3$ wherein the ratio of $Na_2O:SiO_2:B_2O_3$ is between 1:2.5:0.2 and 1.0:3.22:0.5.

7. Hollow borosilicate microspheres comprising $Na_2O$, $SiO_2$, and $B_2O_3$ wherein the ratio of $Na_2O:SiO_2:B_2O_3$ is between 1.0:2.5:0.2 and 1.0:3.22:0.5, said microspheres having a mean diameter between 15 and 20 microns, a diameter between 5 and 45 microns, and a true density below 0.25 g/cc.

8. Hollow borosilicate microspheres made according to a process comprising the steps of:

spray drying a solution of sodium silicate and sodium borate in a spray tower to form a borosilicate precursor;

milling said precursor to form a crushed borosilicate precursor;

heating said crushed precursor to form hollow borosilicate microspheres having a mean diameter below 25 microns and true density below 0.25 g/cc.

* * * * *